United States Patent
Rawdon

(10) Patent No.: US 12,263,937 B2
(45) Date of Patent: Apr. 1, 2025

(54) AIRCRAFT HAVING A CONTROLLABLE CENTER OF GRAVITY AND METHOD OF USE

(71) Applicant: JETZERO, INC., Long Beach, CA (US)

(72) Inventor: Blaine Knight Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/214,440

(22) Filed: Jun. 26, 2023

(65) Prior Publication Data
US 2023/0356829 A1 Nov. 9, 2023

Related U.S. Application Data

(63) Continuation of application No. 17/478,550, filed on Sep. 17, 2021, now Pat. No. 11,724,799.

(51) Int. Cl.
*B64C 17/10* (2006.01)
*B64C 39/10* (2006.01)
*B64D 37/04* (2006.01)

(52) U.S. Cl.
CPC .............. *B64C 17/10* (2013.01); *B64C 39/10* (2013.01); *B64D 37/04* (2013.01)

(58) Field of Classification Search
CPC ......... B64C 39/10; B64C 17/08; B64C 17/10; B64D 37/04
See application file for complete search history.

(56) References Cited

U.S. PATENT DOCUMENTS

| 2,926,688 A | 3/1960 | Muma et al. |
| 2,969,803 A | 1/1961 | Mosher |

(Continued)

FOREIGN PATENT DOCUMENTS

| CN | 109278988 A | 1/2019 |
| CN | 112937838 A | 6/2021 |

(Continued)

OTHER PUBLICATIONS

Shanling Yang; Mark Page; Ed J. Smetak, Achievement of NASA New Aviation Horizons N+2 Goals with a Blended-Wing-Body X-Plane Designed for the Regional Jet and Single-Aisle Jet Markets, Jan. 31, 2018.

(Continued)

*Primary Examiner* — Tye William Abell
(74) *Attorney, Agent, or Firm* — Caldwell Intellectual Property Law

(57) ABSTRACT

Aspects relate to an aircraft having a controllable center of gravity and methods of controlling the center of gravity. An exemplary aircraft having a controllable center of gravity includes a first tank configured to store a first portion of a ballast, a second tank configured to store a second portion of the ballast disposed substantially aft of the first tank, at least a pipe configured to provide fluidic communication between the first tank and the second tank, at least a pump configured to pump the ballast bidirectionally between the first tank and the second tank by way of the at least a pipe, and a controller in communication with the at least a pump and configured to control a ballast ratio of the first portion of the ballast relative the second portion of the ballast and affect an aircraft center of gravity.

19 Claims, 7 Drawing Sheets

(56) References Cited

U.S. PATENT DOCUMENTS

| | | | |
|---|---|---|---|
| 5,321,945 A | 6/1994 | Bell | |
| 5,660,358 A | 8/1997 | Grafwallner et al. | |
| 7,591,277 B2 * | 9/2009 | Johnson | B64C 17/10 |
| | | | 244/135 C |
| 8,408,490 B2 | 4/2013 | McDonnell | |
| 8,965,674 B1 * | 2/2015 | Russell | B64C 17/00 |
| | | | 701/13 |
| 10,273,003 B2 * | 4/2019 | Coulson | B64D 1/16 |
| 10,494,076 B2 | 12/2019 | Kuhlmann | |
| 10,913,528 B1 | 2/2021 | Moore et al. | |
| 11,034,443 B2 | 6/2021 | Frolov et al. | |
| 11,858,647 B2 * | 1/2024 | Miftakhov | H01M 8/04201 |
| 2004/0118969 A1 * | 6/2004 | MacCready | B64C 39/024 |
| | | | 244/5 |
| 2005/0051666 A1 * | 3/2005 | Lee | B64C 17/10 |
| | | | 244/10 |
| 2016/0375985 A1 * | 12/2016 | Ribarov | B64C 17/10 |
| | | | 244/135 C |
| 2017/0320587 A1 | 11/2017 | Dumas et al. | |
| 2018/0001999 A1 * | 1/2018 | Page | B64C 25/14 |
| 2018/0354617 A1 * | 12/2018 | Frolov | B64U 10/25 |

FOREIGN PATENT DOCUMENTS

| | | |
|---|---|---|
| FR | 685486 A | 7/1930 |
| WO | 2008048267 A1 | 4/2008 |

OTHER PUBLICATIONS

Zdobyslaw Goraj, Design and Optimisation of Fuel Tanks for BWB Configurations, Dec. 31, 2016.

\* cited by examiner

AIRCRAFT HAVING A CONTROLLABLE CENTER OF GRAVITY AND METHOD OF USE

CROSS-REFERENCE TO RELATED APPLICATIONS

This application is a continuation of and claims priority to U.S. Non-Provisional Patent App. Ser. No. 17/478,550, filed on Sep. 17, 2021, and entitled "AIRCRAFT HAVING A CONTROLLABLE CENTER OF GRAVITY AND METHOD OF USE" the entirety of which is incorporated herein by reference.

FIELD OF THE INVENTION

The present invention generally relates to the field of aircraft. In particular, the present invention is directed to aircraft having a controllable center of gravity and method of use.

BACKGROUND

Human flight is a large contributor of greenhouse gases, the effects of which are compounded by their release high in the atmosphere. However, non-greenhouse gas generating energy storage methods are less energy dense, according to one or both of volumetric energy density and weight energy density. Presently, current aircraft designs are tightly constrained in both storage volume and weight and alternative aircraft designs may be difficult to control, in some cases as a result of non-ideal and/or changing aircraft center of gravity.

SUMMARY OF THE DISCLOSURE

In an aspect an aircraft having a controllable center of gravity includes a blended wing body, a first tank located within the blended wing body and configured to store a first portion of a non-consumable ballast, a second tank configured to store a second portion of the non-consumable ballast, located within the blended wing body and disposed substantially aft of the first tank, at least a pipe configured to provide fluidic communication between the first tank and the second tank, at least a pump configured to pump the non-consumable ballast bidirectionally between the first tank and the second tank by way of the at least a pipe, and a controller in communication with the at least a pump and configured to control a longitudinal ballast ratio of the first portion of the non-consumable ballast relative the second portion of the ballast and affect an aircraft center of gravity.

In another aspect a method of controlling a center of gravity of an aircraft includes storing, using a first tank located within a blended wing body of the aircraft, a first portion of a non-consumable ballast, storing, using a second tank located within the blended wing body and disposed substantially aft of the first tank, a second portion of the non-consumable ballast, providing, using at least a pipe, fluidic communication between the first tank and the second tank, pumping, using at least a pump, the non-consumable ballast bidirectionally between the first tank and the second tank by way of the at least a pipe, and controlling, using a controller in communication with the at least a pump, a longitudinal ballast ratio of the first portion of the non-consumable ballast relative the second portion of the ballast and affect an aircraft center of gravity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to aircraft having a controllable center of gravity and method of use. In an embodiment, systems and methods for controlling a center of gravity may be used to correct for an aircraft center of gravity, which is outside of a desired range, for example as a result of design considerations.

Aspects of the present disclosure can be used to correct a center of gravity of a blended wing aircraft. Aspects of the present disclosure can also be used to affect center of gravity inflight. This is so, at least in part, because inflight changes in center of gravity can result from consumption of fuel. This affect, in some cases, may be exacerbated through use of sustainable fuel sources such as liquid hydrogen, which require more room and therefore may need to be stored in a fuel store having a centroid substantially non-coincident with a center of gravity of an aircraft.

Aspects of the present disclosure allow for use of blended wing aircraft powered by liquid hydrogen fuels, which are more efficient than today's aircraft and consume energy from sustainable energy sources. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 5. Furthermore, there is no intention to be bound by any expressed or implied theory presented in this disclosure.

Figure 1:
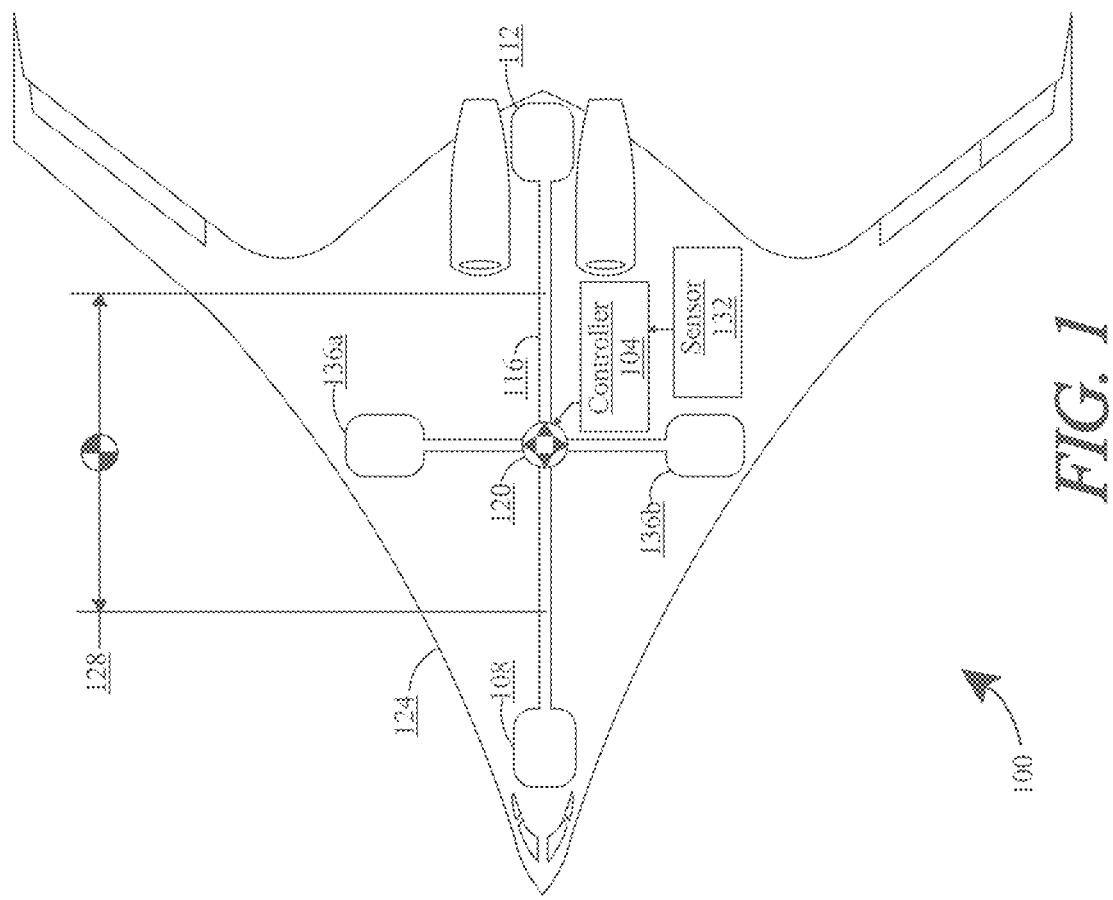
FIG. 1 is a schematic of an exemplary aircraft having a controllable center of gravity.

Referring now to FIG. 1, an exemplary embodiment of an aircraft 100 with controllable center of gravity is illustrated. Aircraft includes a controller 104. Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, aircraft 100 may include a first tank 108. As used in this disclosure, a "tank" is a storage system, for example for a fluid. In some cases, a tank may include a plurality of storage vessels. In some cases, a tank may be sealed to substantially prevent leaking of that which it stores. In some cases, a tank may be vented to allow for free passage of some fluids, such as without limitation air, into and out of the tank. Alternatively, tank may be completely sealed. In some cases, in some cases, a tank may include a storage vessel. In some cases, tank may include a pressure vessel, providing for a pressure difference between inside and outside of the tank. In some cases, a tank may be insulated, for example to prevent electrical and/or thermal communication between inside and outside the tank.

With continued reference to FIG. 1, first tank 108 may be configured to store a first portion of a ballast. As used in this disclosure, "ballast" is a material, having a density, that affects an aircraft center of gravity. Further, an "aircraft center of gravity" as used in this disclosure is a center of gravity of an aircraft. As used in this disclosure, "center of gravity" of a body is a location, such as without limitation a point location, which may be used for a summary description of gravitational interaction of the body. For example in some cases, a center of gravity may be a point at which resultant torque due to force of gravity vanishes. In some cases, center of gravity may include or be a function of a center of mass. Ballast may include a fluid. In some cases, ballast may include a relatively dense fluid (e.g., a fluid having a density no less than that of water), such as without limitation mercury or a slurry. A "slurry," as used in this disclosure, is a mixture of solid particles within, for example suspended in a fluid, for example water and/or oil. In some cases, a slurry may include solid particles that are substantially denser than a constituent fluid. Exemplary non-limiting slurry solid particle materials may include lead, copper, brass, iron, steel, aluminum, and the like. In some embodiments, ballast may include a fuel. Fuel may include any fuel described in this disclosure, including without limitation kerosene-based fuels. In some embodiments, ballast may include an effluent. As used in this disclosure, an "effluent" is wastewater. Exemplary non-limiting forms of effluent include, effluent from a lavatory of aircraft 100, effluent resulting from combustion within an engine, and effluent from electricity production of a fuel cell. Where ballast comprises an effluent and/or a fuel, the ballast may not add substantially to a gross-weight of aircraft 100 (i.e., all-up weight).

With continued reference to FIG. 1, aircraft 100 may include a second tank 112. In some cases, second tank 112 may be configured to store a second portion of ballast. In some cases, second tank 112 may be disposed substantially aft of first tank 108. Second tank 112 and first tank 108 may be located substantially in-line with one another along an axis and/or plane running from a nose of an aircraft back (i.e., roll-axis).

With continued reference to FIG. 1, aircraft 100 may include at least a pipe 116 between first tank 108 and second tank 112. At least a pipe may be configured to provide fluidic communication between first tank 108 and second tank 112. As used in this disclosure, "communication" is an attribute where two or more relate are able to transmit and receive with one another, for example in a certain context. In some cases, communication may be communication of information (i.e., data). In some cases, communication may be within another context, such as without limitation fluidic, electric, thermal, mechanical, and the like. In fluidic communication one or more of fluid, fluid flow, fluid pressure, and the like may be communicated. In electric communication one or more of electric charge, current, potential, and the like may be communicated. In thermal communication one or both of heat, entropy flow, temperature, and the like may be communicated. In mechanical one or more of mass, force, velocity, torque, and the like may be communicated. In hydraulic communication one or more of pressure, flow, and the like may be communicated. In some cases, at least a pipe 116 allows for a mass flow of ballast between first tank 108 and second tank 112. In some cases, at least a pipe 116 allows for a bidirectional mass flow between first tank 108 and second tank 112.

With continued reference to FIG. 1, aircraft 100 may include at least a pump 120. At least a pump 120 may be configured to pump ballast bidirectionally between first tank 108 and second tank 112. At least a pump 120 may include one or more of any type of pump including without limitation centrifugal pumps, positive-displacement pumps, gear pumps, a rotary lobe pumps, progressive cavity pumps, rotary gear pumps, piston pumps, diaphragm pumps, screw pumps, hydraulic pumps, flexible vane or sliding vane pumps, circumferential piston pumps, flexible impeller pumps, helical twisted roots pumps, liquid ring pumps, plunger pumps, rope pumps, chain pumps, and the like. In some cases, at least a pump 120 may be multidirectional and aircraft may include additional ballast tanks disposed at various positions in or on aircraft. In some additional embodiments, ballast may include solids, for instance not in a slurry. Exemplary solids include shot, balls, weights, and the like. In some cases, solid ballast me be conveyed by way of solid material handling methods, including without limitation augers, fluidized beds, conveyors (e.g., conveyor belts, chains and the like), linear guides (e.g., rails and carriages), and the like. In some cases, solid material handling methods may be power by way of electric motors and/or mechanical power, for instance from a combustion engine. In some cases, solid ballast conveyed by way of fluid flow, for instance with an air flow that entrains the solids using a fluidized bed, may be considered a slurry.

With continued reference to FIG. 1, controller 104 may be in communication with at least a pump 120. For example, in some cases, controller 104 may send pump commands to at least a pump 120, for example by way of pump command signals. "Pump command signal," as used in this disclosure, is a signal representing a pump command. "Pump command," as used in this disclosure, is a communication intended for at least a pump 120. In some cases, pump command may be used to affect performance of at least a pump 120. In some cases, controller 104 may receive pump data from at least a pump 120, for example by way of pump data signals. As used in this disclosure, a "pump data signal" is a signal representing pump data. As used in this disclosure, "pump data" is information associated with at least a pump 120. In some cases pump data may represent performance and/or operation of the at least a pump 120. Controller 104 may be configured to control a ballast ratio of a first portion of lateral ballast within first tank 108 relative a second portion of ballast in second tank 112. "Lateral ballast ratio," as used in this disclosure, refers to ratio and/or proportion of ballast in or proximal first tank 108 relative ballast in or proximal second tank 112. "Ballast ratio", as used in this disclosure, refers to ratio and/or proportion of ballast in or proximal a tank relative ballast in or proximal another tank. In some cases, controller 104 may control a ballast center of gravity. As used in this disclosure, "ballast center of gravity" is a center of gravity of ballast. In some cases, ballast center of gravity affects aircraft center of gravity. Therefore, in some cases, controller 104 may affect aircraft center of gravity by way of controlling at least a pump 120. In some cases, controller 104 may control a ballast ratio in order to locate an aircraft center of gravity within a desired center of gravity range 128. In some embodiments, desired center of gravity range 128 may include an acceptable longitudinal range over which aircraft performs safely. Alternatively or additionally, in some embodiments, desired center of gravity range 128 may include a permissible range. As used in this disclosure, a "permissible range" is a range a values for a given specification within which an authority, such as a national or international flight authority and/or standard, permits an aircraft 100 to have, where an aircraft 100 having a value substantially outside of the permissible range would not be permitted to fly. In some cases, a ballast center of gravity affects an aircraft center of gravity through aggregation, for instance summing or averaging of forces and/or moments.

Still referring to FIG. 1, in some embodiments, aircraft 100 may include a blended wing body 124. Blended wing body (BWB) may include any blended wing body described in this disclosure. In some cases, aircraft 100 may be designed with extraordinary constraints. For example, in some embodiments, an aircraft 100 may include a BWB 124 and a fuel store configured to store liquid hydrogen fuel (LH2). In some cases, liquid hydrogen fuel may have a density no more than about one tenth that of jet fuel. Accordingly, in some cases, a BWB aircraft 100 fueled with LH2 may require relatively large fuel storage, for example in order to fly a long distance. In some cases, a centroid of a fuel store may have a centroid that is outside of a desired center of gravity (CG) range 128, for example forward or behind the desired CG range. In some cases, a full fuel store may tend to cause aircraft to be nose-heavy or tail-heavy. Likewise, as a fuel store empties, e.g., through consumption of fuel, may cause aircraft 100 to become tail heavy or nose-heavy. In some cases, a BWB 124 may have a relatively small potential center of gravity range. In some cases, controller 104 may affect aircraft center of gravity to accommodate any this relatively small potential center of gravity range. In some embodiments, controller 104 may be configured to control ballast ratio as a function of inflight changes to aircraft 100 center of gravity. In some cases, inflight changes to aircraft 100 center of gravity may result from consumption of fuel. In some cases, inflight changes to aircraft 100 center of gravity may result from changes in cargo and/or payload. Changes of cargo and/or payload may result from fueling another aircraft with onboard fuel stores. Alternatively or additionally, changes of cargo and/or payload may result from jettisoning cargo and/or payload.

As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, aircraft 100 may include at least a sensor 132. At least a sensor 132 may include any sensor described in this disclosure. At least a sensor may be in communication with controller 104. For example, at least a sensor 132 may provide a sensor data, for example by way of a sensor data signal. "Sensor data," as used in this disclosure, is information associated with a sensor, for example information representative of a phenomenon detected by the sensor. As used in this disclosure, a "sensor data signal" is a signal representative of signal data. In some cases, at least a sensor 132 may be configured to detect a center of gravity phenomenon. As used in this disclosure, a "center of gravity phenomenon" is any phenomenon directly or indirectly associated with a center of gravity, such as without limitation an aircraft center of gravity and/or a ballast center of gravity. Exemplary center of gravity phenomena include, without limitation, fuel store phenomena, and flight component phenomena. For example, in some cases, a fuel store level may indicate a change in a center of gravity. Likewise, in some cases, changes in characteristics of one or more flight components, may be indicative of a change in aircraft center of gravity. Flight component may include any flight component described in this disclosure, including without limitation propulsors and control surfaces.

Still referring to FIG. 1, in some cases, aircraft 100 subsystems, such as without limitation controller 104, at least a pump 120, and/or at least a sensor 132, may perform one or more signal processing steps on a signal. For instance, system 100 may analyze, modify, and/or synthesize a signal in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, in some embodiments, aircraft 100 may additionally include at least a third tank 136a-b. At least a third tank 136a-b may be located laterally distal from one or more of first tank 108 and second tank 112. For instance, at least a third tank may be located laterally outboard, i.e. nearer a wing tip, relative one or more of first tank 108 and second tank 112. In some cases, at least a pipe 116 may be configured to provide fluidic communication with at least a a third ballast tank 136a-b. In some cases, pump 120 may be configured to bidirectionally pump ballast to and from at least a third tank 136a-b. In some cases, pump 120 may include more than one pump and/or a number of valves (e.g., solenoid valves). In some cases, pump 120 and/or at least a pipe 116 may include a fluidic circuit configured to direct ballast into appropriate ballast tanks. In some cases, a third ballast tank 136a or 136b may be configured to store a third portion of ballast. In some cases, controller may be configured to control a lateral ballast ratio. "Lateral ballast ratio", as used in this disclosure, refers to ratio and/or proportion of ballast in or proximal to a tank relative ballast in or proximal another laterally distal tank. For instance, in some embodiments, lateral ballast ration may include a ratio of first portion of the ballast, associated with first tank 108, relative a third portion of ballast, associated with a third tank 136a. In some cases, lateral ballast ratio may affect a aircraft center of gravity, for instance laterally. In some cases, at least a third tank 136a-b may be substantially located within a wing, for example at a distal end of the wing (e.g., wingtip). Although exemplary embodiment described in reference to FIG. 1 shows four ballast tanks, any number of ballast tanks within any location in aircraft 100 may be used.

In some cases, ballast may be adjusted prior to flight and may be substantially static. Alternatively or additionally, in some cases, ballast may be adjusted dynamically, for instance during flight to account for different or shifting payloads or fuel consumption.

Figure 2:
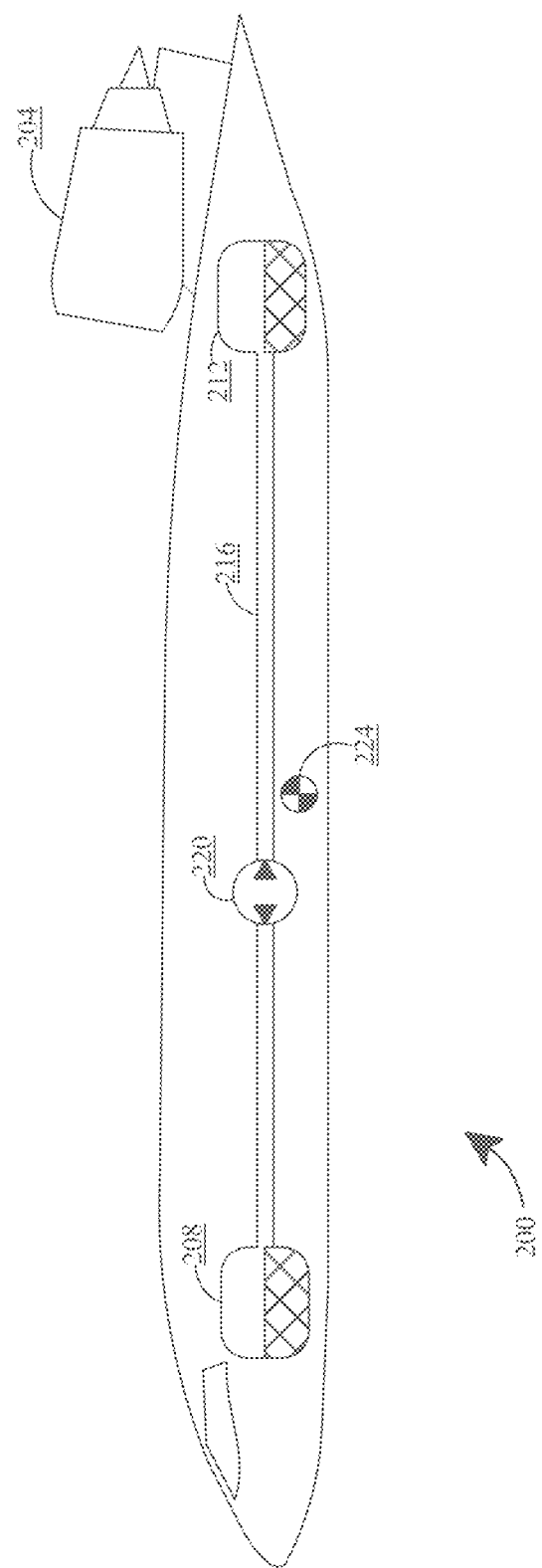
FIG. 2 illustrates an exemplary aircraft with a balanced ballast center of gravity.

Referring now to FIG. 2, an exemplary aircraft 200 is illustrated in a side view. Aircraft 200 is shown having a flight component 204, a first tank 208, a second tank 212, at least a pipe 216, at least a pump 220, and a ballast center of gravity 224. As can be seen in FIG. 2, aircraft 200 is shown with a balanced ballast ratio. For instance, a first portion of ballast in first tank 208 is approximately equal to a second portion of ballast in second tank 212. As a result of this arrangement, ballast center of gravity 324 may be located between first tank 208 and second tank 212, for example approximately halfway between each tank.

Figure 3:
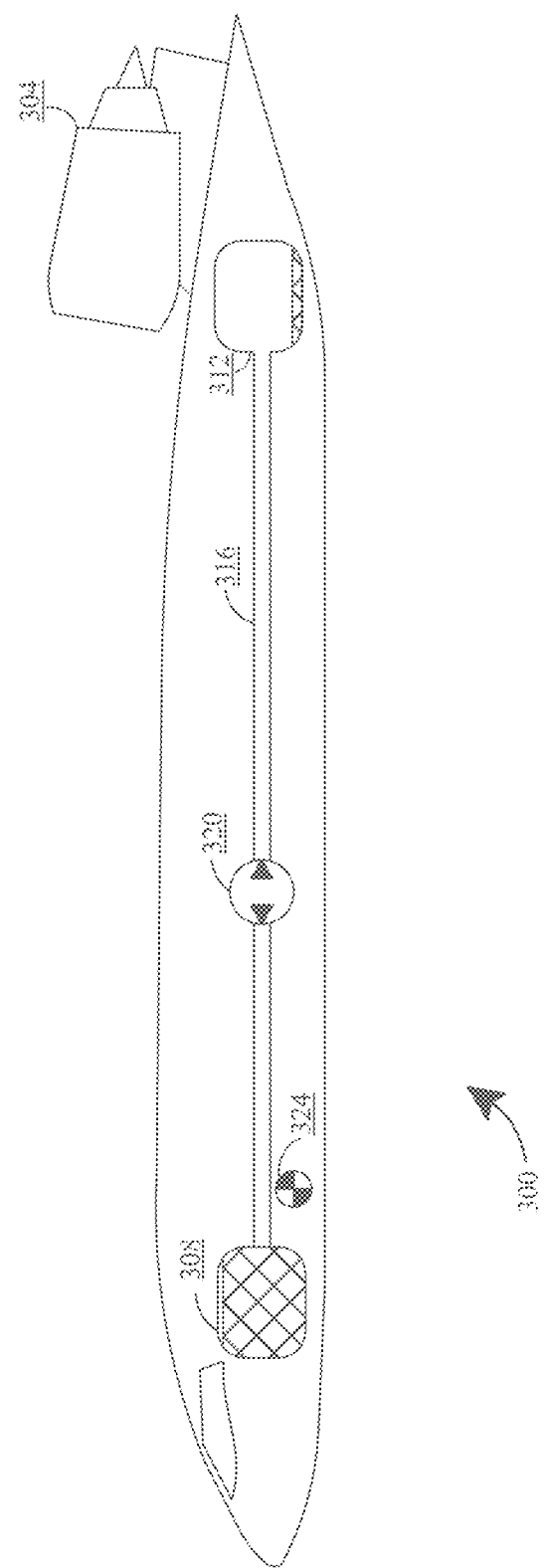
FIG. 3 illustrates an exemplary aircraft with a nose-heavy ballast center of gravity.

Referring now to FIG. 3, an exemplary aircraft 300 is illustrated in a side view. Aircraft 300 is shown having a flight component 304, a first tank 308, a second tank 312, at least a pipe 316, at least a pump 320, and a ballast center of gravity 324. As can be seen in FIG. 3, aircraft 300 is shown with a nose-heavy ballast ratio. For instance, a first portion of ballast in first tank 308 is greater than a second portion of ballast in second tank 312. As a result of this arrangement, ballast center of gravity 324 may be located nearer first tank 308 than second tank 312, for example nearer a nose of aircraft 300.

Figure 4:
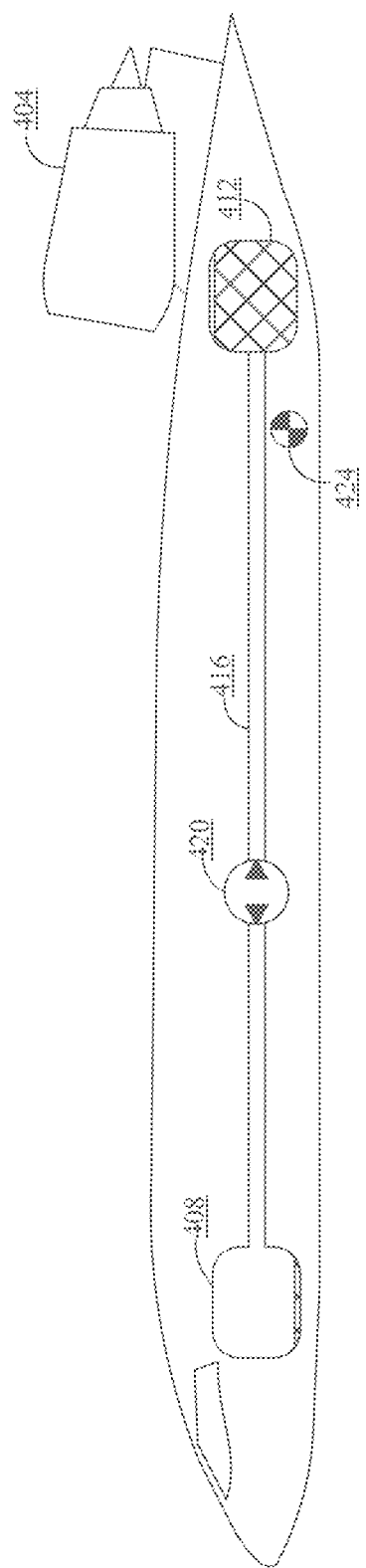
FIG. 4 illustrates an exemplary aircraft with a tail-heavy ballast center of gravity.

Referring now to FIG. 4, an exemplary aircraft 400 is illustrated in a side view. Aircraft 400 is shown having a flight component 404, a first tank 408, a second tank 412, at least a pipe 416, at least a pump 420, and a ballast center of gravity 424. As can be seen in FIG. 4, aircraft 400 is shown with a tail-heavy ballast ratio. For instance, a first portion of ballast in first tank 208 less than a second portion of ballast in second tank 412. As a result of this arrangement, ballast center of gravity 424 may be located farther from first tank 408 than second tank 412, for example farther from a nose of aircraft 400.

Figure 5:
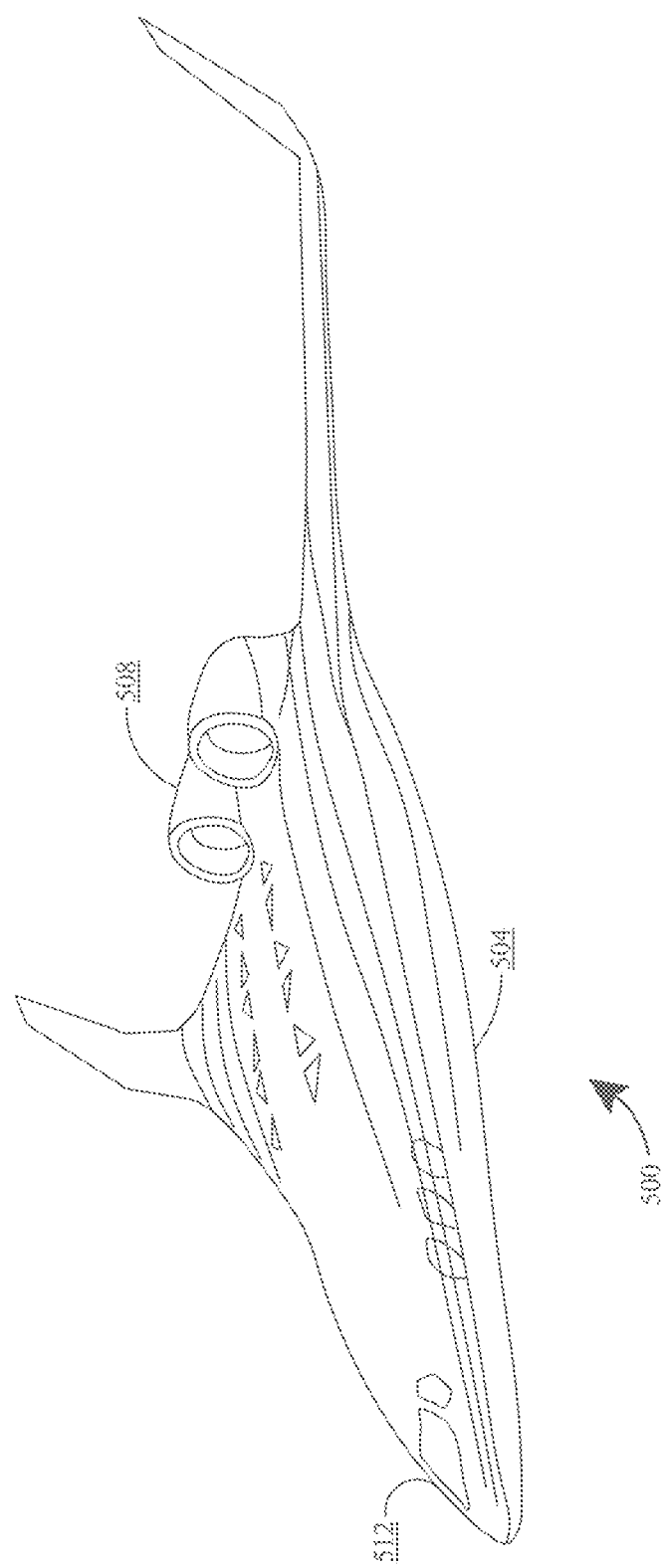
FIG. 5 is a schematic of an exemplary blended wing aircraft.

Referring to FIG. 5, an exemplary blended wing aircraft 500 is illustrated. Aircraft 500 may include a blended wing body 504. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at a leading edge of the wings. For example, a BWB 504 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 504 design may or may not be tailless. One potential advantage of a BWB 504 may be to reduce wetted area and any accompanying drag associated with a conventional wing-body junction. In some cases, a BWB 504 may also have a wide airfoil-shaped body, allowing entire aircraft to generate lift and thereby facilitate reduction in size and/or drag of wings. In some cases, a BWB 504 may be understood as a hybrid shape that resembles a flying wing, but also incorporates features from conventional aircraft. In some cases, this combination may offer several advantages over conventional tube-and-wing airframes. In some cases, a BWB airframe 504 may help to increase fuel economy and create larger payload (cargo or passenger) volumes within the BWB. BWB 504 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 5, BWB 504 of aircraft 500 may include a nose portion. A "nose portion," for the purposes of this disclosure, refers to any portion of aircraft 500 forward of the aircraft's fuselage 516. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 5, BWB 504 may include at least a structural component of aircraft 500. Structural components may provide physical stability during an entirety of an aircraft's 500 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 500 structure, they may be so named A, B, C, and so on named from nose to tail. Pillars, like any structural element, may be disposed a distance away from each other, along an exterior of aircraft 500 and BWB 504. Depending on manufacturing method of BWB 504, pillars may be integral to frame and skin, comprised entirely of internal framing, or alternatively, may be only integral to structural skin elements. Structural skin will be discussed in greater detail below.

With continued reference to FIG. 5, BWB 504 may include a plurality of materials, alone or in combination, in its construction. At least a BWB 504, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 504 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 504 may additionally or alternatively use wood or another suitably strong yet light material for an internal structure.

With continued reference to FIG. 5, aircraft 500 may include monocoque or semi-monocoque construction. BWB 504 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 5, BWB 504 may include at least a fuselage. A "fuselage," for the purposes of this disclosure, refers to a main body of an aircraft 500, or in other words, an entirety of the aircraft 500 except for nose, wings, empennage, nacelles, and control surfaces. In some cases, fuselage may contain an aircraft's payload. At least a fuselage may comprise structural components that physically support a shape and structure of an aircraft 500. Structural components may take a plurality of forms, alone or in combination with other types. Structural components vary depending on construction type of aircraft 500 and specifically, fuselage. A fuselage 512 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 5, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 500. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 500 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 5, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 5, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 5, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 504. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 5, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 500 is in its level flight orientation or sitting on ground. A post may act similarly to stringer in that it is configured to support axial loads in compression due to a load being applied parallel to its axis due to, for example, a heavy object being placed on a floor of aircraft 500. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 5, aircraft 500 may include at least a flight component 508. A flight component 508 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 500 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 500. In some embodiments, at least a flight component 508 may include a propulsor, for example a rotor attached to an electric motor configured to produce shaft torque and in turn, create thrust.

As used in this disclosure, an "electric motor" is an electrical machine that converts electric energy into mechanical work.

With continued reference to FIG. 5, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 5, at least a flight component may be one or more devices configured to affect aircraft's 500 attitude. "Attitude", for the purposes of this disclosure, is the relative orientation of a body, in this case aircraft 500, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 500. A plurality of attitude datums may indicate one or more measurements relative to an aircraft's pitch, roll, yaw, or throttle compared to a relative starting point. One or more sensors may measure or detect an aircraft's 500 attitude and establish one or more attitude datums. An "attitude datum", for the purposes of this disclosure, refers to at least an element of data identifying an attitude of an aircraft 500.

With continued reference to FIG. 5, in some cases, aircraft 500 may include at least a pilot control. As used in this disclosure, a "pilot control," is an interface device that allows an operator, human or machine, to control a flight component of an aircraft. Pilot control may be communicatively connected to any other component presented in aircraft 500, the communicative connection may include redundant connections configured to safeguard against single-point failure. In some cases, a plurality of attitude datums may indicate a pilot's instruction to change heading and/or trim of an aircraft 500. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver.

In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 500. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 508 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 5, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 508. At least a flight component 508 may include any propulsor as described herein. In embodiment, at least a flight component 508 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 5, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 5, at least a flight component 508 may include wings, empennages, nacelles, control surfaces, fuselages, and landing gear, among others, to name a few. In embodiments, an empennage may be disposed at the aftmost point of an aircraft body 504. Empennage may comprise a tail of aircraft 500, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 500 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 500 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 504 aircraft 500 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 508 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 508 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 500. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 500 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 5, aircraft 500 may include an energy source. Energy source may include any device providing energy to at least a flight component 508, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 5, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 504 of aircraft 500, for example without limitation within a wing portion 512 of blended wing body 508. Aviation fuels may include petroleum-based fuels, or petroleum and synthetic fuel blends, used to power aircraft 500. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 500. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 5, modular aircraft 500 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 5, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 5 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 5, aircraft 500 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 5, aircraft 500 may include multiple flight component 508 sub-systems, each of which may have a separate energy source. For instance, and without limitation, one or more flight components 508 may have a dedicated energy source. Alternatively, or additionally, a plurality of energy sources may each provide power to two or more flight components 508, such as, without limitation, a "fore" energy source providing power to flight components located toward a front of an aircraft 500, while an "aft" energy source provides power to flight components located toward a rear of the aircraft 500. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 508. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 5, aircraft 500 may include a flight component 508 that includes at least a nacelle 508. For the purposes of this disclosure, a "nacelle" is a streamlined body housing, which is sized according to that which is houses, such as without limitation an engine, a fuel store, or a flight component. When attached by a pylon entirely outside an airframe 504 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 500 partially or wholly enveloped by an outer mold line of the aircraft 500. At least a nacelle may be designed to be streamlined. At least a nacelle may be asymmetrical about a plane comprising the longitudinal axis of the engine and the yaw axis of modular aircraft 500.

With continued reference to FIG. 5, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 5, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 5, in nonlimiting embodiments, at least a flight component 508 may include an airbreathing engine such as a jet engine, turbojet engine, turboshaft engine, ramjet engine, scramjet engine, hybrid propulsion system, turbofan engine, or the like. At least a flight component 508 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel.

Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 5, an aircraft 500 may include a flight controller. As used in this disclosure, a "flight controller" is a device that generates signals for controlling at least a flight component 508 of an aircraft 500. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 5, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 500 and/or computing device.

With continued reference to FIG. 5, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
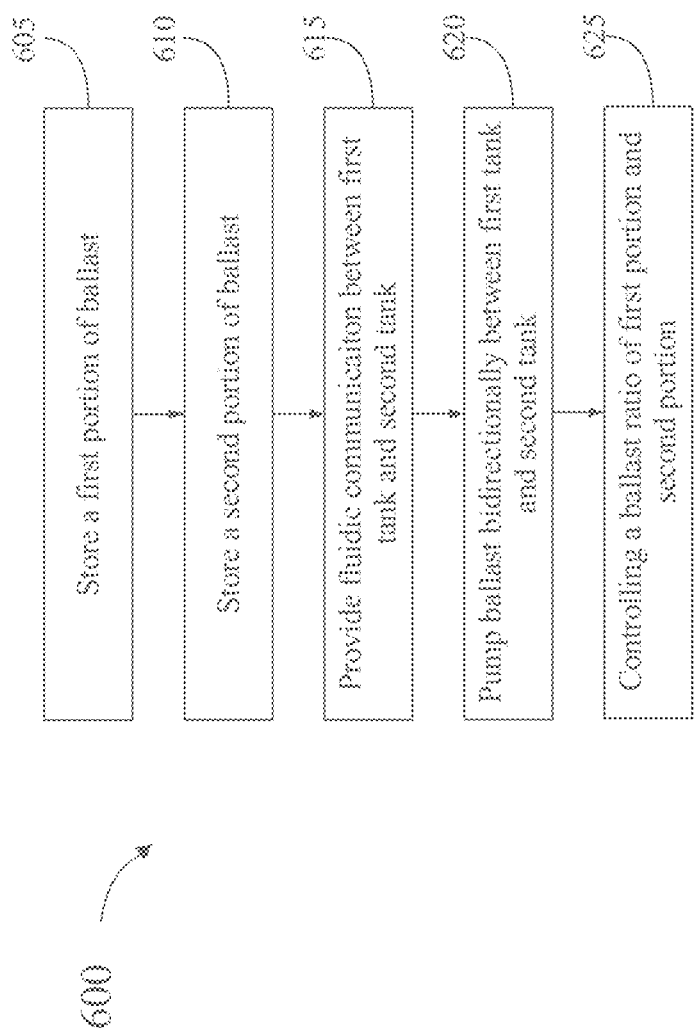
FIG. 6 is a flow diagram illustrating an exemplary method of controlling a center of gravity of an aircraft.

Referring now to FIG. 6, an exemplary method 600 of controlling a center of gravity of an aircraft is illustrated by way of a flow diagram. An aircraft may include any aircraft described in this disclosure, for example with reference to FIGS. 1-5. In some embodiments, aircraft may include a blended wing body. Blended wing body may include any blended wing body described in this disclosure, for example with reference to FIGS. 1-5. A center of gravity may include any center of gravity described in this disclosure, for example with reference to FIGS. 1-5. At step 605, method 600 includes storing, using a first tank, a first portion of a ballast. First tank may include any tank described in this disclosure, for example with reference to FIGS. 1-5. Ballast may include any ballast described in this disclosure, for example with reference to FIGS. 1-5. In some embodiments, ballast may include a slurry. Slurry may include any slurry described in this disclosure, for example with reference to FIGS. 1-5. In some embodiments, ballast may include an effluent. Effluent may include any effluent described in this disclosure, for example with reference to FIGS. 1-5. In some embodiments, ballast may include a fuel. Fuel may include any fuel described in this disclosure, for example with reference to FIGS. 1-5.

With continued reference to FIG. 6, at step 610, method 600 includes storing, using a second tank disposed substantially aft of first tank, a second portion of ballast. Second tank may include any tank described in this disclosure, for example with reference to FIGS. 1-5.

With continued reference to FIG. 6, at step 615, method 600 includes providing, using at least a pipe, fluidic communication between first tank and second tank. At least a pipe may include any pipe described in this disclosure, for example with reference to FIGS. 1-5.

With continued reference to FIG. 6 at step 620, method 600 includes pumping, using at least a pump, ballast bidirectionally between first tank and second tank by way of at least a pipe. At least a pump may include any pump described in this disclosure, for example with reference to FIGS. 1-5.

With continued reference to FIG. 6, at step 625, method 600 includes controlling, using a controller in communication with at least a pump, a ballast ratio of first portion of ballast relative second portion of ballast. In some cases, ballast ratio may affect a ballast center of gravity and/or an aircraft center of gravity. Controller may include any controller and/or computing device described in this disclosure, for example with reference to FIGS. 1-5 and 7. Ballast ratio may include any ballast ratio described in this disclosure, for example with reference to FIGS. 1-5. Ballast center of gravity may include any ballast center of gravity described in this disclosure, for example with reference to FIGS. 1-5. Aircraft center of gravity may include any aircraft center of gravity described in this disclosure, for example with reference to FIGS. 1-5. In some embodiments, ballast center of gravity affects aircraft center of gravity by relocating the aircraft center of gravity to a favorable location within a permissible range. In some embodiments, step 625 may be performed as a function of inflight changes to aircraft center of gravity. In some cases, inflight changes to aircraft center of gravity may result from consumption of fuel.

Still referring to FIG. 6, in some embodiments, method 600 may additionally include storing, using a fuel store, liquid hydrogen fuel. Fuel store may include any fuel store described in this disclosure, for example with reference to FIGS. 1-5. Liquid hydrogen fuel may include any liquid hydrogen fuel described in this disclosure, for example with reference to FIGS. 1-5.

Still referring to FIG. 6 in some embodiments, method 600 may additionally include detecting, using at least a sensor in communication with controller, a center of gravity phenomenon associated with one or more of aircraft center of gravity and ballast center of gravity. At least a sensor may include any sensor described in this disclosure, for example with reference to FIGS. 1-5. Center of gravity phenomenon may include any center of gravity phenomenon described in this disclosure, for example with reference to FIGS. 1-5.

Still referring to FIG. 6, in some embodiments, method 600 may additionally include storing, using a third tank located within blended wing body and disposed substantially outboard of first tank, a third portion of the ballast, providing, using at least a pipe, fluidic communication between the first tank and the third tank, pumping, using at least a pump, the ballast bidirectionally between the first tank and the third tank by way of the at least a pipe, and controlling, using controller, a lateral ballast ratio of first portion of the ballast relative third portion of the ballast and affect aircraft center of gravity. Third tank may include any tank described in this disclosure, for example with reference to FIG. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
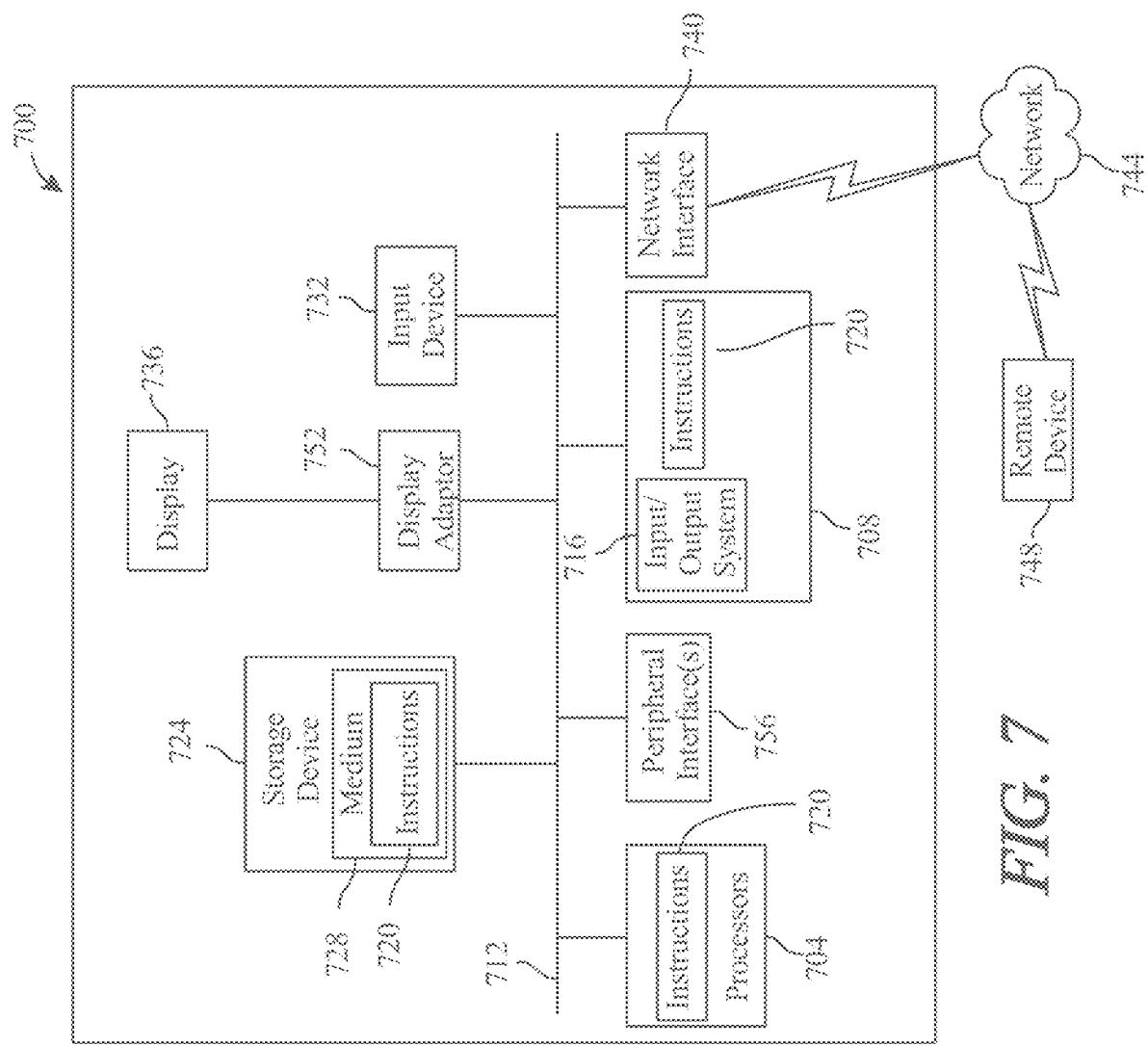
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft having a controllable center of gravity, the aircraft comprising:
   a blended wing body;
   a first tank located within the blended wing body and configured to store a first portion of a non-consumable ballast, wherein the non-consumable ballast comprises a slurry;
   a second tank configured to store a second portion of the non-consumable ballast, located within the blended wing body and disposed substantially aft of the first tank;
   at least a pipe configured to provide fluidic communication between the first tank and the second tank;
   at least a pump configured to pump the non-consumable ballast bidirectionally between the first tank and the second tank by way of the at least a pipe; and
   a controller in communication with the at least a pump and configured to control a longitudinal ballast ratio of the first portion of the non-consumable ballast relative the second portion of the non-consumable ballast and affect an aircraft center of gravity.

2. The aircraft of claim 1, wherein the non-consumable ballast comprises an effluent.

3. The aircraft of claim 1, wherein the non-consumable ballast comprises water.

4. The aircraft of claim 1, wherein the non-consumable ballast comprises a discrete ballast.

5. The aircraft of claim 1, wherein the controller is further configured to control the non-consumable ballast ratio as a function of inflight changes to the aircraft center of gravity.

6. The aircraft of claim 5, wherein the inflight changes to the aircraft center of gravity result from consumption of fuel.

7. The aircraft of claim 1, wherein a non-consumable ballast center of gravity affects the aircraft center of gravity by relocating the aircraft center of gravity to a favorable location within a permissible range.

8. The aircraft of claim 7, wherein the non-consumable ballast center of gravity is located within a controllable range located ahead of the aircraft center of gravity.

9. The aircraft of claim 7, wherein the non-consumable ballast center of gravity is located within a controllable range overlapping with the aircraft center of gravity.

10. A method of controlling a center of gravity of an aircraft, the method comprising:
    storing, using a first tank located within a blended wing body of the aircraft, a first portion of a non-consumable ballast, wherein the non-consumable ballast comprises a slurry;

storing, using a second tank located within the blended wing body and disposed substantially aft of the first tank, a second portion of the non-consumable ballast;

providing, using at least a pipe, fluidic communication between the first tank and the second tank;

pumping, using at least a pump, the non-consumable ballast bidirectionally between the first tank and the second tank by way of the at least a pipe; and controlling, using a controller in communication with the at least a pump, a longitudinal ballast ratio of the first portion of the non-consumable ballast relative the second portion of the non-consumable ballast and affect an aircraft center of gravity.

11. The method of claim 10, wherein the non-consumable ballast comprises a slurry.

12. The method of claim 10, wherein the non-consumable ballast comprises an effluent.

13. The method of claim 10, wherein the non-consumable ballast comprises water.

14. The method of claim 10, wherein a non-consumable ballast center of gravity affects the aircraft center of gravity by relocating the aircraft center of gravity to a favorable location within a permissible range.

15. The method of claim 10, wherein the controller is further configured to control the non-consumable ballast ratio as a function of inflight changes to the aircraft center of gravity.

16. The method of claim 10, wherein the inflight changes to the aircraft center of gravity result from consumption of fuel.

17. The method of claim 10, wherein the non-consumable ballast comprises a discrete ballast.

18. The method of claim 17, wherein the non-consumable ballast center of gravity is located within a controllable range located ahead of the aircraft center of gravity.

19. The method of claim 17, wherein the non-consumable ballast center of gravity is located within a controllable range overlapping with the aircraft center of gravity.

* * * * *